(No Model.)
F. F. LANDIS.
FRICTIONAL GEARING.
No. 562,624. Patented June 23, 1896.
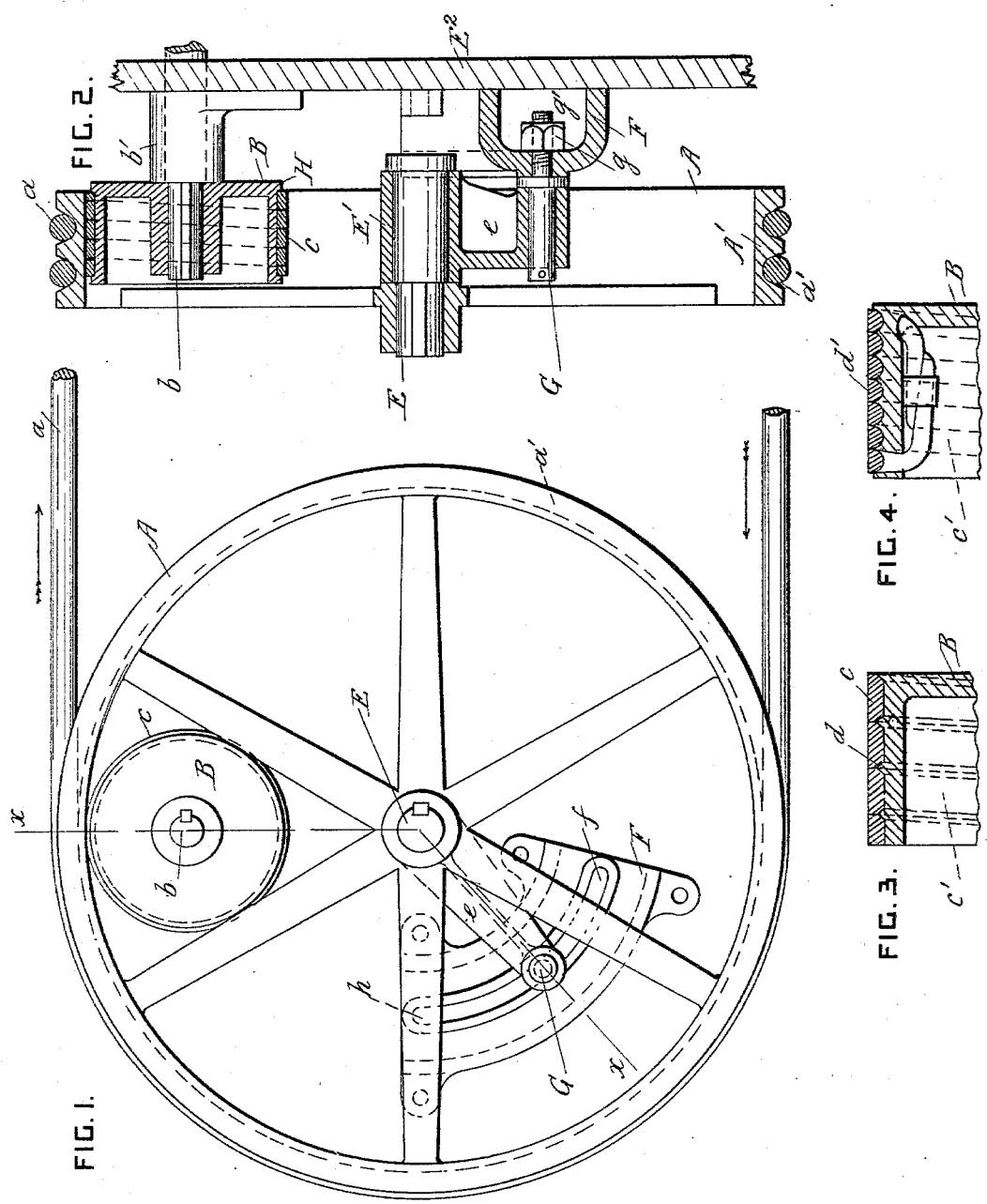
Witnesses
Arthur S Brown
F A Elmore
Inventor
Frank F. Landis
By Attorney
Herbert W. Jenner

UNITED STATES PATENT OFFICE.

FRANK F. LANDIS, OF WAYNESBOROUGH, PENNSYLVANIA.

FRICTIONAL GEARING.

SPECIFICATION forming part of Letters Patent No. 562,624, dated June 23, 1896.

Application filed October 9, 1895. Serial No. 565,198. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Frictional Gearing; and I do hereby declare the following to be a full, clear, and exact description of the invention, such as will enable others skilled in the art to which it appertains to make and use the same.

This invention relates to frictional driving mechanism; and it consists in the novel construction and combination of the parts hereinafter fully described and claimed whereby the friction-wheels are pressed together.

In the drawings, Figure 1 is a front view of one form of friction driving-gear constructed according to this invention. Fig. 2 is a cross-section through the same, taken on the line $x\,x$ in Fig. 1. Figs. 3 and 4 are cross-sections of the pinion, showing modifications.

A is a driving-wheel driven in the direction of the arrow by any approved driving device subject to longitudinal tension. Driving-cords $a$ are shown, which engage with grooves $a'$ on the wheel A, but other driving devices may be used, such as a belt or a drive-chain.

The driving-wheel A has a circular friction-surface A' and forms an internal friction-wheel. The surface A' is preferably plain and cylindrical, but it may be of other approved form, such as conical, or it may have circumferential grooves for the prevention of slip.

B is the friction-pinion, which is driven by the wheel A.

The pinion B has a friction-surface conforming to the friction-surface A' of the driving-wheel, and it is secured upon a shaft $b$, which is journaled in suitable bearings, such as $b'$.

The friction-pulley B may bear direct against the friction-wheel or it may be covered with some soft material, such as leather. When covered with leather, a leather lace $c$ is preferably wound upon its periphery in spiral form, and has its ends secured together, or to the pinion, in any approved manner.

H are flanges or ribs on the pinion to prevent the lateral displacement of its covering.

In the modification shown in Fig. 3, spiral grooves $c'$ are formed on the pinion, and the ribs $d$ between the grooves are less in height than the thickness of the leather. The ribs embed themselves in the leather at the meeting edges of the lace and prevent the lateral displacement of the leather covering.

In the modification shown in Fig. 5, a cord $d'$ is wound in the spiral grooves $c'$ and has its outer surface flattened and treated with paint or other similar material to give it better qualities of wear and adhesion. The ends of the cord are passed through holes at the edges of the pinion and are secured together.

The driving-wheel A is secured upon the end of a shaft E, which is journaled in a bearing $E^2$ on the end of an arm $e$.

F is a stationary bracket secured to a support E', such as the side of a threshing-machine. The bracket F is provided with a slot $f$, which is preferably curved and concentric with the shaft E.

G is a pin secured to the bracket F by the nut $g$, which is slidable in a recess $g'$ when slack. The arm $e$ is pivoted on the pin G.

The upper end $h$ of the slot $f$ lies in a plane midway between the driving-cords. When the pin G is at the end $h$ of the slot, the wheel bears downward on the pinion B, and the center line of the arm $e$ is in line with the direction of the longitudinal pull of the driving-cords due to their tension. In this position the friction-wheel is only pressed on the pinion by its own weight, which is sufficient for driving a light load, and the tension of the driving-cords has no effect upon the adhesion between the friction wheel and pinion. When the pin G is moved to the position shown in the drawings, the arm $e$ lies at an angle to the said plane drawn midway between the driving-cords, and the tension of the driving-cords causes the friction-wheel to bear on the pinion with greatly-increased force. This force, which produces the adhesion necessary for various loads, may be adjusted by moving the pin G to various positions in the slot, the exact position varying for a given load according to the relative size and proportion of the various parts.

What I claim is—

1. In frictional gearing, the combination, with a friction-pinion, of a pivoted arm having an adjustable fulcrum, a friction driving-wheel carried by the free end of the said arm and bearing on the said pinion, and a driving device subject to tension for operating the said wheel, substantially as set forth.

2. In frictional gearing, the combination, with a friction-pinion, of a pivoted arm having an adjustable fulcrum, an internal friction driving-wheel carried by the free end of the said arm and bearing on the said pinion, and a driving device subject to tension for operating the said wheel, substantially as set forth.

3. In frictional gearing, the combination, with a friction-pinion, of a stationary bracket provided with a slot, an arm provided with a pivot adjustable in the said slot, a friction driving-wheel carried by the free end of the said arm and bearing on the said pinion, and a driving device subject to tension for operating the said wheel, substantially as set forth.

4. In frictional gearing, the combination, with a friction-pinion, of an internal friction driving-wheel bearing on the said pinion, a driving device subject to tension for operating the said wheel, a bracket provided with a curved slot concentric with the axis of the said wheel, and an arm provided with a pin adjustable in the said slot, the free end of the said arm carrying the said wheel, substantially as set forth.

5. In frictional gearing, the combination, with a friction-pinion, of a bracket, an arm provided with a pivot adjustable on the said bracket, a friction driving-wheel carried by the free end of the said arm and bearing on the said pinion, and a driving device subject to tension for operating the said wheel, substantially as set forth.

6. In frictional gearing, the combination, with a friction-pinion, of an internal friction driving-wheel bearing on the said pinion, a driving device subject to tension for operating the said wheel, a curved bracket arranged substantially concentric with the axis of the said wheel, and an adjustable arm pivoted to the said bracket and supporting the said wheel, substantially as set forth.

In testimony whereof I affix my signature in presence of two witnesses.

FRANK F. LANDIS.

Witnesses:
T. S. CUNNINGHAM,
EZRA F. LANDIS.